United States Patent

[11] 3,553,437

[72] Inventor Wilson P. Boothroyd
Carlisle, Mass.
[21] Appl. No. 635,557
[22] Filed May 2, 1967
[45] Patented Jan. 5, 1971
[73] Assignee Sylvania Electric Products, Inc.
a corporation of Delaware

[54] OPTICAL LABEL READING SYSTEM AND APPARATUS
6 Claims, 7 Drawing Figs.

[52] U.S. Cl. .... 235/61.11, 250/219; 340/146.3
[51] Int. Cl. .... G06k 7/15; G01n 21/30; G06k 9/04
[50] Field of Search .... 235/61.115, 61.11SCR; 178/7.6; 356/23—25; 340/146.3RR, 146.3; 250/219wd, 219I, IC1, 219Idc, 219Id

[56] References Cited
UNITED STATES PATENTS

| | | | |
|---|---|---|---|
| 2,956,117 | 10/1960 | Ernst et al. | 340/146.3RR |
| 2,983,444 | 5/1961 | Martin et al. | 235/61.115 |
| 3,262,098 | 7/1966 | Lebell | 340/146.3 |
| 3,250,172 | 5/1966 | Abbott et al. | 356/25 |
| 3,270,319 | 8/1966 | Schmid | 340/146.3 |
| 3,277,283 | 10/1966 | Rabinow | 340/146.3X |
| 3,289,172 | 11/1966 | Towle | 235/61.115X |
| 3,433,933 | 3/1969 | Hardin | 235/61.115 |
| 3,465,288 | 9/1969 | Silverman et al. | 340/146.3 |
| 3,052,405 | 9/1962 | Woodland | 235/61.115 |

*Primary Examiner*—Daryl W. Cook
*Assistant Examiner*—Robert M. Kilgore
*Attorneys*—Norman J. O'Malley, Elmer J. Nealon and Peter Xiarhos

ABSTRACT: Optical label reading system including apparatus for reading coded labels affixed to moving objects or vehicles. A label bearing a code pattern formed of retroreflective material is attached to an object or a vehicle in a predetermined "label area." When the object or vehicle appears within a predetermined region or "read zone" of the optical label reading apparatus, the label area is flash illuminated by a source of light and, as a result, a reflected optical image of the coded label and label area is translated through an optical shutter and lens onto a photoconductive image surface of a vidicon tube and stored thereby. The stored image of the vidicon tube is read out by a television-type raster scanning pattern and the video output signal from the vidicon tube, after suitable processing, is applied to suitable logic and decoder circuitry for decoding thereof.

PATENTED JAN 5 1971 3,553,437

SHEET 1 OF 2

INVENTOR.
WILSON P. BOOTHROYD

BY Peter Xiarhos
AGENT.

INVENTOR.
WILSON P. BOOTHROYD

BY Peter Xiarhos

AGENT.

OPTICAL LABEL READING SYSTEM AND APPARATUS

BACKGROUND OF THE INVENTION

The invention described in the instant application relates to optical label reading apparatus and, more particularly, to optical label reading apparatus suitable for use in object or vehicle identification systems.

Various prior art systems and apparatus are known for reading coded information disposed on stationary or moving objects or vehicles. Typical examples of such prior art reading systems include those which rely for their operation on principles of optics, magnetics, radioactivity, ultrasonics, and radio frequency. In general, such reading systems have not received widespread acceptance because of excessive cost, unreliability for applications requiring heavy usage, or because of other disadvantages. A particular disadvantage of many optical label readers. of which the instant application is primarily concerned, has been that they often require the design and use of rather complex, specialized code-sensing and code-storage circuitry. Such complexity arises because such circuitry must be tailored to the type of label, label orientation, or code utilized, the speed and direction of motion of a coded object or vehicle, or other details related to a particular code-sensing and code-reading application.

SUMMARY OF THE INVENTION

The present invention avoids many of the difficulties and disadvantages associated with the various prior art code-reading systems, and particularly those systems of the optical type, by employing conventional components which function in a conventional manner, and which can be readily integrated to form a relatively low-cost system. As will become apparent from a detailed description of the construction and operation of the optical label reading apparatus, the invention can be readily adapted to read any one of a wide variety of code types and code patterns which may appear on labels having differing geometries and physical orientations. Additionally, because of a novel arrangement of an image translating means and an image storage means to be described hereinafter, a coded label on an object or vehicle can be read as the object or vehicle moves in a general direction and at a reasonable speed either toward, away from, or past the optical label reading apparatus. From the above brief discussion, it is evident that the optical label reading apparatus of the invention is particularly suited for use in toll booth applications, for example, the identification of a code-bearing fleet trucks and vehicles surface secured to said such as state and throughway vehicles, for identifying coded railroad cars, or for quality and inventory control.

Briefly, the optical label reading apparatus of the invention comprises an image storage means adapted to retain an optical image, an image translating means adapted to translate an optical image of a label having coded information thereon onto the image storage means whereby the image is retained by the image storage means, and readout means adapted to read out the image stored by the image storage means to provide an indication of the code information on the label.

In the operation of the above described optical label reading apparatus, an image of a coded label is translated by the image translating means onto the image storage means each time that a vehicle or object equipped with a coded label located within a predetermined label area appears within the read zone of the reading apparatus. The translated image is retained by the image storage means until read out by the readout means. When the image is read out by the readout means, an indication of the coded information on the label is provided by the image storage means. As will become apparent from a detailed description of the invention, the optical label reading apparatus of the invention may be adapted to read rectangular "skewed" or "tilted" binary-coded labels, a physical orientation commonly encountered in actual practice, or rectangular, "unskewed" binary-coded labels. For ease of understanding the broad concept of the invention, the construction and operation of the optical label reading apparatus of the latter situation will be described first.

DESCRIPTION OF THE PREFERRED EMBODIMENT

Figure 1:
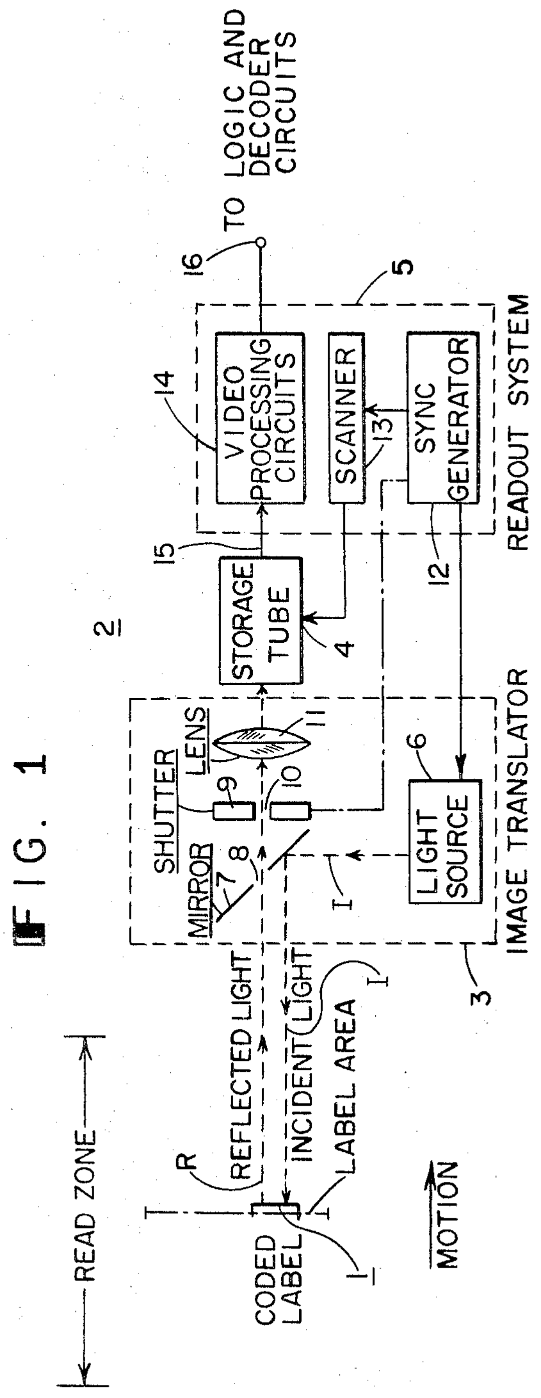
FIG. 1 is a diagrammatic representation of a label reading system embodying the optical label reading apparatus of the invention and includes the general directional and positional relationship between a rectangular, horizontally oriented coded label and the optical label reading apparatus.

Referring to the drawings, FIG. 1 shows a diagrammatic representation of a label reading or identification system adapted for the reading of a rectangular, horizontally oriented coded label. Generally, the label reading system comprises an optical label reading apparatus 2 and a coded label 1 located within a predetermined "label area." Additionally, the coded label 1 is located within a predetermined "read zone" definitive of the operating range of the optical label reading apparatus 2. The optical label reading apparatus 2 further comprises an image translator 3 which includes a light source 6, an apertured mirror 7, an optical shutter 9, and an optical focusing lens 11; a storage tube 4; and, a readout system 5 which includes a sync generator 12, a scanner 13, and video processing circuits 14.

Figure 2:
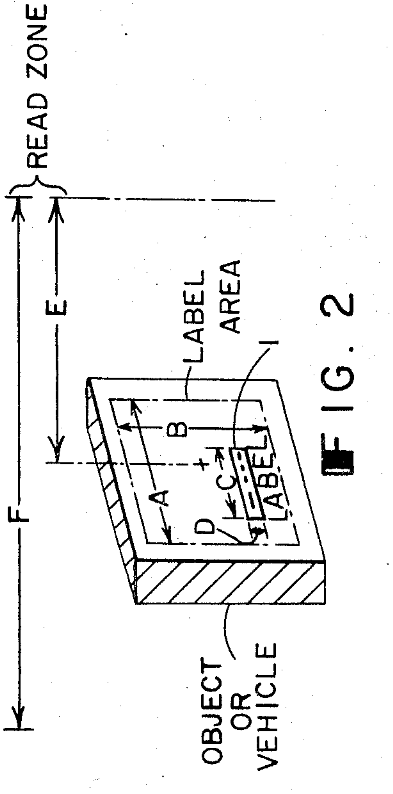
FIG. 2 is a representation more clearly showing the directional and positional relationship between the coded label and the optical label reading apparatus of FIG. 1.

FIG. 2 illustrates in greater detail than shown in FIG. 1 the directional and positional relationship between the coded label 1 and the optical label reading apparatus 2. As indicated the rectangular coded label 1 is affixed to a stationary or moving object or vehicle within an area of the object or vehicle designated in FIG. 2, and also in FIG. 1, as "label area." For purposes of discussion, the boundaries of the label area may be defined by a width of A units and a height of B units and the rectangular label by a width of C units and a height of D units. A "read zone," within which the label area is located during a reading operation, may be defined as having a minimum reading distance of E units and a maximum reading distance of F units. In actual practice, the values of the above-designated dimensions and distances A through E in a particular application are determined in accordance with such factors as the range, operating capabilities, and the degree of sensitivity of the optical label reading apparatus 2.

Figure 3:
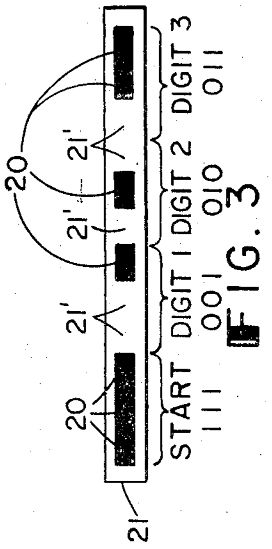
FIG. 3 is a diagrammatic representation of an exemplary binary-coded label, bearing a start code and three coded digits, to be described in conjunction with the operation of the optical label reading apparatus of FIG. 1.

FIG. 3 illustrates a typical rectangular binary-coded label usable in the label reading system of FIG. 1. For the sake of simplicity and for ease of discussion, a binary code comprises three start bits 1 1 1 and three binary digits 0 0 1, 0 1 0, and 0 1 1 has been selected. However, a greater or lesser number of bits may be used as deemed necessary or desirable. The binary digit 0 0 1 represents in known fashion a decimal digit "1," the binary digit 0 1 0, a decimal digit "2," and the binary digit 0 1 1, a decimal digit "3." Typically, the binary code may represent the identity of the object or vehicle and/or some characteristic thereof such as weight, size, or contents.

The binary "one" bits of the code shown in FIG. 3 are formed of preferably rectangular light-reflecting elements 20 of appropriate size, positioned on a background area 21 of a material generally incapable of reflecting incident light to any significant degree. An area 21' within which no light-reflecting element 20 is placed represents a binary 0. A satisfactory material for use as the light-reflecting elements 20 is commonly known by the trade name "Scotchlite," a product of the 3M Company, St. Paul, Minnesota. Alternatively, light-reflecting jewel elements of any satisfactory size or shape may be employed.

The operation of the label reading system of FIG. 1 to read the rectangular binary-coded label 1 of FIG. 3 will now be described in detail. Initially, an optical image of the coded label 1 and label area is translated or projected onto a photoconductive image surface of the image storage tube 4 by the image translator 3. The image translation operation is accomplished as follows. Each time a code-bearing object or vehicle is presented to the optical label reading apparatus, i.e., appears within the "read zone" of the label reading system, high intensity light having a visible high blue to ultraviolet spectrum is momentarily radiated by the light source 6 via a silvered front surface of the mirror 7 is arbitrarily located. The light source 6 is either operated in a repetitive fashion by the sync generator 12, or, optionally, by means of a signal from a photocell arrangement or a zone trip mechanism (not shown) actuated by the object or vehicle upon entering the read zone.

At the same instant that the light source 6 is actuated to "-freeze" the motion of the code-equipped object or vehicle, the optical shutter 9, typically a rotating slit or a pin hole shutter, is also operated by the sync generator 12. While the optical shutter aperture 10 is open, the incident light, one ray of which is shown at I in FIG. 1, is reflected to a minor degree by the label area and to a significantly greater degree by the light-reflecting code elements 20 disposed on the coded label 1. The retroreflected light, one ray of which is shown at R in FIG. 1, passes through an aperture or opening 8 in the mirror 7, through the opening 10 in the optical shutter 9, and through the optical focusing lens 11 onto the photoconductive image surface of the image storage tube 4. Since the optical shutter opening 10 is closed immediately after the reflected light reaches the image storage tube 4, no other light reaches the image storage tube until the next object or vehicle enters the read zone. Additionally, by closing the shutter opening 10, spurious light signals which may otherwise reach the image storage tube 4 via the mirror and shutter openings 8 and 10 are minimized.

The image storage tube 4, which may be a vidicon tube, latently stores the reflected optical image of the coded label and label area on the photoconductive image surface thereof in a known manner. That is, a charge pattern is established on the light-irradiated photoconductive image surface whereby the image surface becomes conductive to a degree related to the relative brightness of each corresponding portion of the image focused thereupon. Accordingly, the surface potential of the photoconductive image surface increases to a degree related to the individual illumination of each illuminated element. The image is retained by the photoconductive image surface until such time as the image storage tube is read out. Since the light source 6 is selected so as to emit light of a generally high intensity, the retroreflected light from the coded label 1 is made to exceed spurious light levels at the image storage tube. Additionally, the image storage tube sensitivity is adjusted in a conventional manner to work within the dynamic range of light returned from a label such as caused by dirt and label deterioration.

Figure 4:
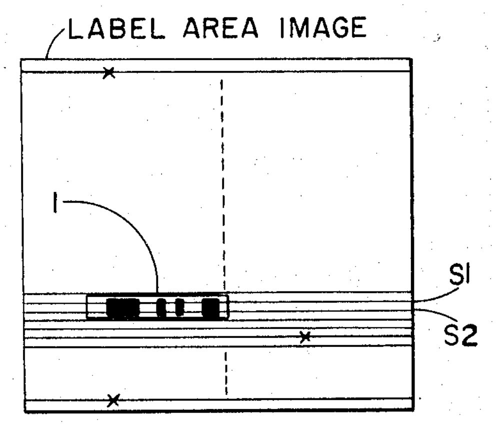
FIG. 4 is a pictorial representation of an image of the label area as defined in FIG. 2 including therein an image of the coded label shown in FIG. 3.

The signal contents of the storage tube 4 are read out in a destructive manner by a conventional television-type raster scanning pattern. Specifically, the readout is accomplished by the scanner 13 under control of the sync generator 12 by the mechanism of an unmodulated electron beam scanning the previously exposed photoconductive image surface of the image storage tube 4. The electron beam deposits electrons on the photoconductive image surface by one or more scans thereof in sufficient quantities to return each surface element of the photoconductive image surface to its original potential, i.e., to neutralize the original charge pattern. The number of scan lines, the distance separating the individual scan lines constituting the raster pattern, and scan rate are determined in a known manner in accordance with the size of the label area within which a coded label is likely to appear, and the individual dimensions of the label and the light-reflecting bit elements. Thus, for example, by selecting appropriate values of A through E in FIG. 2 for the present example, and a horizontal scan arrangement, i.e., parallel to the label, the data disposed on the rectangular, horizontally oriented coded label shown in FIG. 3 can be read, for example, by at least one of a plurality of horizontal scan lines. FIG. 4 pictorially illustrates this situation.

As shown in FIG. 4 by way of example, the horizontal scan lines S1 and S2 intercept all of the bits of the latent image of the coded label 1 while the remaining scan lines do not. As a result of each interception of the imaged bits by the scan lines S1 and S2, a video signal is produced at the output of the image storage tube 4 on a video output line 15. Each video signal is amplified and amplitude sliced by the video processing circuits 14, of a conventional nature, to provide an electrical signal at the output terminal 16 indicative of the code pattern represented on the coded label 1. The waveform of such a signal is shown in FIG. 5.

Figure 5:
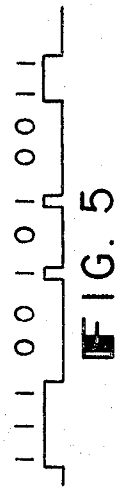
FIG. 5 is a waveform diagram illustrating the video output signal of the optical label reading apparatus of FIG. 1 corresponding to the coded information on the coded label of FIG. 3.

Although not shown in the drawings, the coded signal appearing at the output terminal 16 and illustrated by FIG. 5 may then be processed by suitable logic and decoder circuitry compatible with the selected code, label orientation, and the scanning rate of the scanner 13. In this manner, the identity of the particular object or vehicle in the read zone, or other characteristics thereof can be readily ascertained. Any random spurious reflections which may form part of the image picked up by the image storage tube 4, such as shown at X in FIG. 4, would obviously not be detected by the logic and decoder circuitry. The output of the logic and decoding circuitry may then be applied to suitable remote or local printout or display apparatus (not shown).

Figure 6:
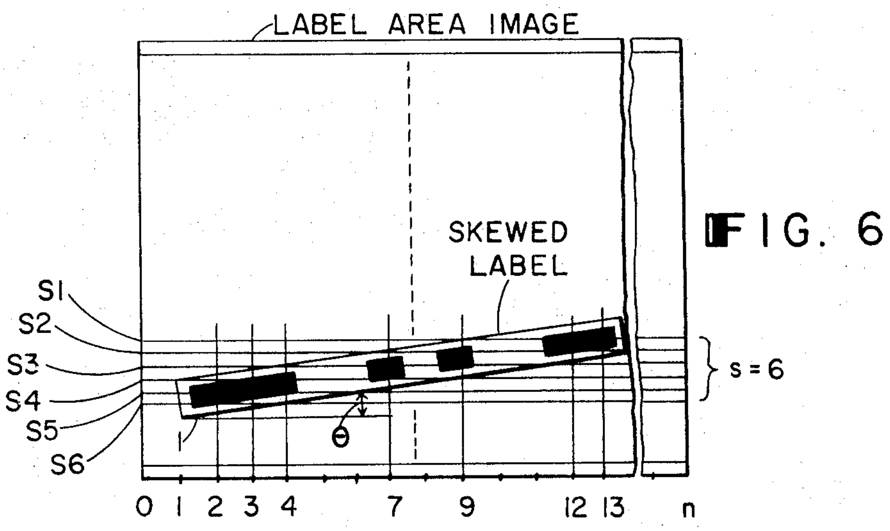
FIG. 6 is a greatly enlarged pictorial representation of the label area image resulting from orienting the coded label of FIG. 3 at a maximum skew angle $\theta$.
Figure 7:
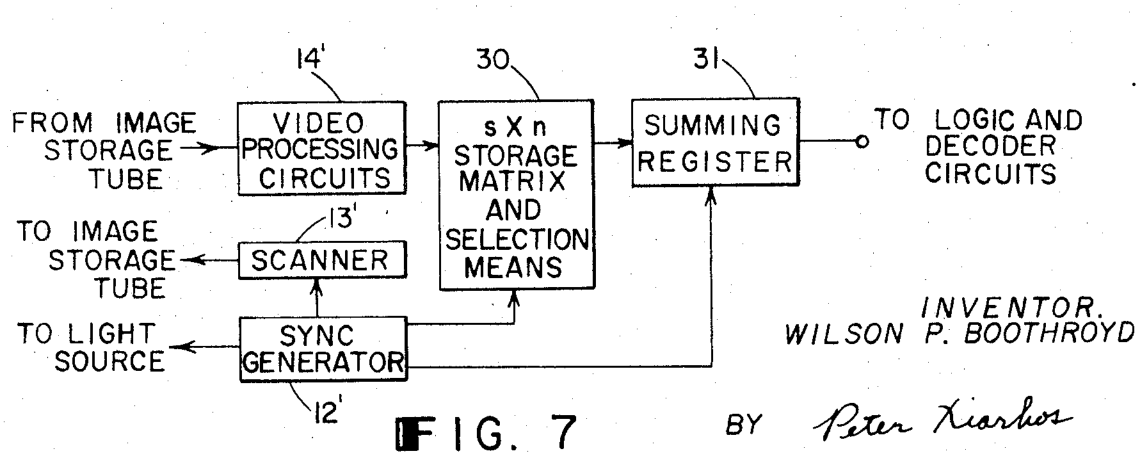
FIG. 7 is a block diagram of a readout system employed for reading coded data on a label skewed in the manner shown in FIG. 6.

In the above example, it has been assumed for purposes of illustration and for understanding the broad concept of the invention, that the rectangular coded label 1 illustrated in FIGS. 1 through 4 has been oriented within the label area in a horizontal manner. Since in actual practice it is quite possible that the label may be skewed at some angle relative to the width dimension of the label area, as shown in the enlarged pictorial representation of FIG. 6, for example, some provision must be made for reading not only the aforedescribed horizontally oriented labels but also for correctly reading the coded data appearing on such skewed labels. This provision is necessary particularly since it is likely that for certain angles of skew no single scan line may intercept all the bits of a code pattern in the manner depicted by FIG. 4. FIG. 7 is a block diagram of a modified readout system which may be used together with the previously described image translator 3 and image storage tube 4 for reading out data on skewed as well as nonskewed labels.

The modified readout system of FIG. 7 comprises sync generator 12', a scanner 13' and video processing circuits 14', as in FIG. 1, and an $s$ by $n$ storage matrix and selection means 30, and a summing register 31. Both the $s$ by $n$ storage matrix and selection means 30 and the summing register 31 are operated under control of the sync generator 12'. The storage matrix section of the $s$ by $n$ storage matrix and selection means 30 is constructed to have $s$ rows and $n$ columns of storage elements, magnetic cores, for example. The value of $s$ is made equal to the maximum number of scan lines required to read out the stored image of any coded label appearing within a label area and having a maximum acceptable degree of skew, $\theta°$. The value of $n$ is made equal to the maximum number of storage locations required by the storage matrix to record the individual positions, relative to the starting point of each of the $s$ scan lines, at which "one" bits of any reasonably skewed coded label are intercepted by the scan lines.

The selection of values for $s$ and $n$ can be more clearly understood by referring again to FIG. 6. As shown therein, the coded data on a coded label 1, skewed by a maximum acceptable skew angle $\theta$, can be read by a set of a maximum of $s$ scan lines S1....S6. Obviously, where the angle of skew is less than $\theta°$, including $\theta = 0°$, fewer than six scan lines are needed and fewer than six rows of the storage matrix are utilized. Additionally, as shown in FIG. 6, for each interception of a "one" bit by the individual ones of the six scan lines S1......S6, a corresponding storage location, represented by 0......$n$ along the base of the label area image, is provided. Since the label area image is resolved into a large number of divisions 0......$n$ to accommodate any label location within the label area, a column storage location is provided in the rows of the storage matrix for accommodating each interception of a "one" bit by one or more scan lines.

Briefly, the operation of the readout system of FIG. 7 is as follows. The $s$ by $n$ storage matrix and selection means 30 is adapted to store in sequential fashion in the $s$ rows thereof the processed video signals from the video processing circuits 14' resulting from the scanning of the image storage tube 4 by the scanner 13'. After each line scan, the contents of the storage matrix at the various column storage positions are nondestructively read out under the control of the sync generator 12' into the summing register 31. The summing register contents are also read out by the sync generator 12' after each line scan and applied to suitable logic and decoder circuits (not shown) as previously described.

Since the storage matrix is constructed to store only $s$ rows of scan information, where the value of $s$ is small compared with the total number of scan lines required to scan an entire label area image, and since most of the scan lines with the exception of scan lines directly intercepting the imaged label bits provide little useful information, the storage matrix must be continuously up-dated. This up-dating is accomplished by storing the information derived from each new scan line and discarding the information derived from the first one of the $s$ scan lines previously stored. Thus, after each processing of information from a scan line, the storage matrix stores information derived from a different set of $s$ scan lines. As the above process of storing and discarding continues, a point is eventually reached where the storage matrix contains information derived from the correct set of $s$ scan lines, that is, the set of scan lines which directly intercept the imaged bits.

In FIG. 6, the correct set of $s$ scan lines is shown at S1....S6, where $s$ equals six as previously noted. From the above discussion and from FIG. 6, it is clear that the storage matrix contains the following stored signal information: signals at column storage locations 12 and 13 of a first row of the storage matrix as a result of the information derived from the scan line S1; signals at column locations 9 and 12 of a second row as a result of information derived from the scan line S2; signals at column locations 7 and 9 of a third row as a result of information derived from the scan line S3; a signal at column locations 4 and 7 of a fourth row as a result of information derived from the scan line S4; signals at column locations 2, 3, and 4 of a fifth row as a result of information derived from the scan line S5; and, a signal at column location 2 of a sixth row as a result of information derived from the scan line S6. Thus, when the information stored by the storage matrix at the various column locations is read out as previously suggested, individual signals are provided in proper time sequence at column output lines corresponding to the column storage locations 2, 3, 4, 7, 9, 12 and 13. In actual practice, the durations 0....$n$ are made shorter than shown in FIG. 6 to increase the chances of detecting all of the coded data. Accordingly, signals are stored at more than one memory location per bit, such stored signals being identified and combined in the logic and decoder circuitry.

The above-mentioned individual signals are applied to the summing register 31 and subsequently to the logic and decoder circuits, and printout or display equipment. The waveform of the signal appearing at the output terminal of the summing register 31 is shown in FIG. 5 and, as may be noted, is the same as that derived from the reading operation previously described in conjunction with FIGS. 1 through 5.

Some typical values of parameters which may be used in the systems shown in FIGS. 1 through 7 and described hereinabove are as follows. The individual code bits 20, FIG. 3, may be one-half inch wide and one-quarter inch high. Accordingly, a label length C. FIG. 2, of approximately 6 ½ inches, and a height D of approximately three-quarters of an inch, are adequate. The dimensions A and B, FIG. 2, may be 48 inches and 42 inches, respectively. The minimum and maximum reading distances E and F, FIG. 2, may suitably by 15 and 30 feet, respectively. The "on" time of the light source 6, FIG. 1, may be approximately 3 microseconds, a label image may be stored by the image storage tube for 50 milliseconds and read out one or more times during the 50 millisecond interval. With the above values, a scan rate of 60 hertz (field) is appropriate. Two hundred fifty-two lines per field and 96 bits per scan line $n$ are adequate to accommodate the 42 by 48 inch label area. Accordingly, the bit clock rate for the above system is approximate 1.45 megahertz.

The 1.45 megahertz bit clock rate may be reduced substantially in certain applications to approximately 0.12 megahertz by employing label bits ½ inch wide by 3 inches high. In such event, the number of scan lines and bits per scan line are reduced from the previous example to 21 and 96, respectively. Moreover, by using a label having bits of increased height, the additional apparatus shown in FIG. 7 is unnecessary since at least one scan line will intercept such a label of increased height even when such label is skewed at some acceptable skew angle.

MODIFICATIONS

Although the operation of the label reading apparatus 2 of FIG. 1 and as modified by the apparatus of FIG. 7 has been described in connection with a particular combination of a rectangular, horizontally oriented label and horizontal scan, and motion of an object or a vehicle toward the optical label reading apparatus 2, it is to be clearly understood that many other alternatives are available. For example, since the image translator 3 is capable of freezing any reasonable motion of an object or a vehicle, the label reading system of FIG. 1 can be adapted to read a coded label affixed to an object or vehicle which is moved in a direction away from the optical label reading apparatus 2, as well as laterally past the optical label reading apparatus in either direction. Furthermore, any suitable "label geometry-orientation-scan combination" and appropriate scan rate may be used.

Additionally, the scanning raster itself may be oriented to accommodate a particular label orientation, for instance, a skewed label orientation. In each instance, the particular system application and the special problems associated with each application dictate the most suitable arrangement of label size, orientation and scan.

Moreover, for verification purposes, it is possible to read out the coded label data image stored by the image storage tube 4 two or three times during the interval in which the image is retained by the photoconductive image surface of the image storage tube, provided this can be done before the stored image has been erased to such a degree that it is no longer recognizable. Alternatively, for verification purposes, it is possible to place a duplicate coded label adjacent to the first coded label and to read both labels and to derive code information from both readings.

The optical label reading apparatus 2 is also capable of reading a great variety of code types and code patterns since no specific circuitry is required to distinguish between code types and code patterns. Rather, it is only necessary to employ logic and decoding circuitry suitably compatible with the particular type of code arrangement or pattern employed.

Variations may also be made in the image translating means of the invention. Thus, instead of the described flash-illumination arrangement, a source of light may be continuously directed toward a label area and the light periodically interrupted by means of an apertured shutter to effect a translation of a label image onto the image storage means. Additionally, it is possible to use a continuous light source and to periodically operate a shutter so as to permit reflected light to pass therethrough only for a predetermined period of time.

It will now be apparent that a novel optical label reading apparatus for reading coded labels has been disclosed in such full, clear, concise, and exact terms as to enable any person skilled in the art to which such apparatus pertains to construct and use the same. It will also be apparent that various changes and modifications may be made in form and detail by those skilled in the art without departing from the spirit and scope of the invention. Therefore, it is intended that the invention shall not be limited except as by the appended claims.

I claim:

1. Optical label reading apparatus comprising:
a storage tube having an image surface adapted to retain an image;
image translating means adapted to translate an image of a label having coded information thereon onto the image surface of the storage tube, whereby said image is retained by the image surface of the storage tube; and
readout means adapted to read out said image stored by the image surface of the storage tube to provide an indication of the coded information on said label, said readout means including:
a scanning means adapted to scan the image surface of the storage tube with a plurality of scan lines and a sync generator for controlling the operation of the scanning means; and
a storage matrix having a plurality of $s$ storage rows adapted to store information derived from a set of $s$ scan lines, where $s$ is equal to the maximum number of scan lines required to read the coded information on a label having a maximum skew angle $\theta$, said storage matrix being continuously updated after each scan line whereby said storage matrix stores information derived from a different set of $s$ scan lines after each line scan.

2. Optical label reading apparatus comprising:
a storage tube having an image surface adapted to retain an optical image;
illuminating means adapted to radiate with light a label having light-reflecting and light nonreflecting elements thereon arranged in a coded configuration and representing coded information;
means adapted to pass therethrough onto the image surface of the storage tube a reflected optical image of said coded label whereby said image is retained by the image surface of the storage tube; and
readout means adapted to read out said image stored by the image surface of the storage tube to provide an indication of the coded information represented by said coded configuration, said readout means including:
scanning means adapted to scan the image surface of the storage tube with a plurality of scan lines; and
a storage matrix having a plurality of $s$ storage rows adapted to store information derived from a set of $s$ scan lines, where $s$ is equal to the maximum number of scan lines required to read the coded information on a label having a maximum skew angle $\theta$, said storage matrix being continuously updated after each scan line whereby said storage matrix stores information derived from a different set of $s$ scan lines after each line scan.

3. Optical label reading apparatus in accordance with claim 2 wherein said illuminating means comprises a light source; and
means adapted to direct light from said light source onto said label.

4. Optical label reading apparatus in accordance with claim 2 wherein said means adapted to pass a reflected optical image therethrough comprises:
an apertured shutter means disposed in the optical path of said reflected optical image; and
means adapted to focus said reflected optical image after passage through said apertured shutter means onto the image surface of the storage tube.

5. Optical label reading apparatus comprising:
a storage tube having an image surface adapted to retain an image;
means adapted to radiate with light only during a first predetermined period of time a label having light-reflecting and light nonreflecting elements arranged in a coded configuration and representing coded information;
means adapted to pass therethrough onto the image surface of the storage tube a reflected optical image of said coded label whereby said image is retained by the image surface of the storage tube, the image surface of the storage tube being adapted to retain said image for a second predetermined period of time, said second predetermined period of time being greater than said first predetermined period of time; and
readout means adapted to read out said image stored by the image surface of the storage tube during said second predetermined period of time to provide an indication of the coded information represented by said coded configuration, said readout means including:
scanning means adapted to scan the image surface of the storage tube with a plurality of scan lines; and
a storage matrix having a plurality of $s$ storage rows adapted to store information derived from a set of $s$ scan lines, where $s$ is equal to the maximum number of scan lines required to read the coded information on a label having a maximum skew angle $\theta$, said storage matrix being continuously updated after each scan line whereby said storage matrix stores information derived from a different set of $s$ scan lines after each line scan.

6. In a label reading system including a label bearing a code pattern formed of light-reflecting and light nonreflecting elements, optical label reading apparatus comprising:
an image storage tube having a photoconductive image surface responsive to an optical image to establish a charge pattern thereon in accordance with the relative brightness of each portion of the optical image;
means adapted to illuminate said code-bearing label when said code-bearing label appears within a predetermined label area and a predetermined read zone; means adapted to pass therethrough onto the photoconductive image surface of the storage tube a reflected optical image of said code-bearing label whereby said image is retained by the photoconductive image surface of the storage tube; and
readout means adapted to read out said image stored by the photoconductive image surface of the storage tube, said readout means including:
scanning means adapted to scan the photoconductive image surface of the image storage tube with a plurality of scan lines, said scanning means providing a source of unmodulated electrons in the form of a scanning raster pattern for neutralizing the charge pattern established on the photoconductive image surface of the image storage tube whereby an indication of the code on said code-bearing label is provided by the image storage tube; and
a storage matrix having a plurality of $s$ storage rows adapted to store information derived from a set of $s$ scan lines, where $s$ is equal to the maximum number of scan lines required to read the coded information on a label having a maximum skew angle $\theta$, said storage matrix being continuously updated after each scan line whereby said storage matrix stores information derived from a different set of $s$ scan lines after each line scan.